United States Patent
Nishiyama (10) Patent No.: US 9,232,089 B2
(45) Date of Patent: Jan. 5, 2016

(54) DISPLAY PROCESSING APPARATUS, CONTROL METHOD, AND COMPUTER PROGRAM

(71) Applicant: CANON KABUSHIKI KAISHA, Tokyo (JP)

(72) Inventor: Kaori Nishiyama, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/043,341

(22) Filed: Oct. 1, 2013

(65) Prior Publication Data

US 2014/0104646 A1    Apr. 17, 2014

(30) Foreign Application Priority Data

Oct. 15, 2012    (JP) ................................. 2012-228427

(51) Int. Cl.
*H04N 1/00* (2006.01)

(52) U.S. Cl.
CPC ......... *H04N 1/00381* (2013.01); *H04N 1/0035* (2013.01); *H04N 1/00392* (2013.01)

(58) Field of Classification Search
None
See application file for complete search history.

(56) References Cited

U.S. PATENT DOCUMENTS

| | | | | |
|---|---|---|---|---|
| 8,448,086 B2* | 5/2013 | Miyazawa | ............ | G06F 3/0488 715/702 |
| 8,610,933 B2* | 12/2013 | Tani | ..................... | G03G 15/502 345/173 |
| 8,724,127 B2* | 5/2014 | Tani | ..................... | G03G 15/502 358/1.13 |
| 2009/0070711 A1* | 3/2009 | Kwak | .................. | G06F 3/0485 715/829 |
| 2009/0298554 A1* | 12/2009 | Kim | ........................ | H04M 1/21 455/574 |
| 2011/0199628 A1* | 8/2011 | Tohki | ................... | H04N 1/0035 358/1.13 |
| 2011/0199629 A1* | 8/2011 | Sensu | ................ | H04N 1/00411 358/1.13 |
| 2011/0199637 A1* | 8/2011 | Yoshida | ............. | H04N 1/00411 358/1.15 |
| 2012/0050779 A1* | 3/2012 | Tani | .................... | H04N 1/00411 358/1.13 |
| 2012/0050807 A1* | 3/2012 | Noda | .................. | H04N 1/00411 358/1.15 |
| 2012/0092692 A1* | 4/2012 | Yoshida | .................. | G06F 3/041 358/1.13 |
| 2013/0033717 A1* | 2/2013 | Matsumoto | ........... | G06F 3/0483 358/1.13 |
| 2013/0077119 A1* | 3/2013 | Arai | .......................... | B41J 29/00 358/1.13 |
| 2013/0104078 A1* | 4/2013 | Miyazaki | ........... | H04N 1/00411 715/833 |
| 2013/0229370 A1* | 9/2013 | Shimizu | .................. | G06F 3/048 345/173 |
| 2014/0071483 A1* | 3/2014 | Urakawa | ............ | H04N 1/00408 358/1.15 |
| 2014/0098402 A1* | 4/2014 | Komaba | ............. | G03G 15/5016 358/1.15 |
| 2014/0104648 A1* | 4/2014 | Shinosaki | .......... | H04N 1/00352 358/1.15 |

FOREIGN PATENT DOCUMENTS

JP    10-056564 A    2/1998

* cited by examiner

*Primary Examiner* — Ted Barnes
(74) *Attorney, Agent, or Firm* — Fitzpatrick, Cella, Harper & Scinto (57) ABSTRACT

An image processing apparatus displays an input screen including a setting area in which setting items are selectably arranged, and detects an operation on the input screen. When a flick operation has been detected in the setting area, the image processing apparatus enlarges the setting area, and moves the setting items in the setting area based on the speed of the flick operation. Then, the image processing apparatus sets a setting item in a selection area among a plurality of the setting items arranged in the enlarged setting area to a selected state.

13 Claims, 6 Drawing Sheets

| 400% (Maximum) |
| 300% |
| 200% |
| 150% |
| 115% (B4→A3) |
| Same size (100%) |
| 90% |
| 80% |
| 50% |
| 25% (Minimum) |

FIG. 10B

| 119% |
| 118% |
| 117% |
| 116% |
| 115% (B4→A3) |
| 114% |
| 113% |
| 112% |
| 111% |
| 110% |

FIG. 10A

| 400% (Maximum) |
| 200% (A5→A3) |
| 141% (B5→B4) |
| 122% (A5→B5) |
| 115% (B4→A3) |
| Same size (100%) |
| 86% (A3→B4) |
| 81% (B5→A5) |
| 70% (B4→B5) |
| 61% (A3→B5) |

DISPLAY PROCESSING APPARATUS, CONTROL METHOD, AND COMPUTER PROGRAM

BACKGROUND OF THE INVENTION

1. Field of the Invention

The present invention relates to a display processing apparatus, a control method, and a computer program.

2. Description of the Related Art

A display processing apparatus that displays an input screen in which standard settings and arbitrary settings coexist is proposed. The input screen of such display processing apparatus will be described taking a magnification screen of an image processing apparatus as an example. On the magnification screen, a user can select a standard magnification setting provided with an enlargement rate or reduction rate in advance based on a predetermined paper size, or an arbitrary magnification setting by which any magnification can be set within a predetermined range. Japanese Patent Application Laid-Open No. H10-56564 discloses a fax machine that displays standard magnifications and arbitrary magnifications on the same screen at the same time.

For a conventional display processing apparatus, however, a user has to perform setting operations many times in order to, for example, select a desired magnification setting, and this is troublesome to a user. Specifically, a user has to make a display processing apparatus to display a magnification screen and depress a button corresponding to any standard magnification on the magnification screen in the case of setting a standard magnification, or has to input and determine an arbitrary magnification using a ten-key pad while a magnification screen is displayed in the case of setting an arbitrary magnification.

SUMMARY OF THE INVENTION

The present invention provides a display processing apparatus that enables a user to select a desired setting by a simple operation.

A display processing apparatus according to one embodiment of the present invention comprises: a display unit configured to display an input screen including a setting area in which setting items are selectably arranged; a detection unit configured to detect an operation on the input screen; a control unit configured to control the change of setting items arranged in the setting area based on the detected operation, wherein the control unit increases the number of the setting items arranged in the setting area when the detection unit has detected a flick operation by a pointing device in the setting area, and moves the setting items in the setting area based on the speed of the flick operation; and a selection unit configured to set a setting item in a predetermined selection area in the setting area to a selected state, among the setting items whose number is increased.

The display processing apparatus according to the present invention enables a user to select a desired setting by a simple operation without frequently performing setting screen transitions and user operations.

Further features of the present invention will become apparent from the following description of exemplary embodiments (with reference to the attached drawings).

DESCRIPTION OF THE EMBODIMENTS (First Embodiment)

Figure 1:
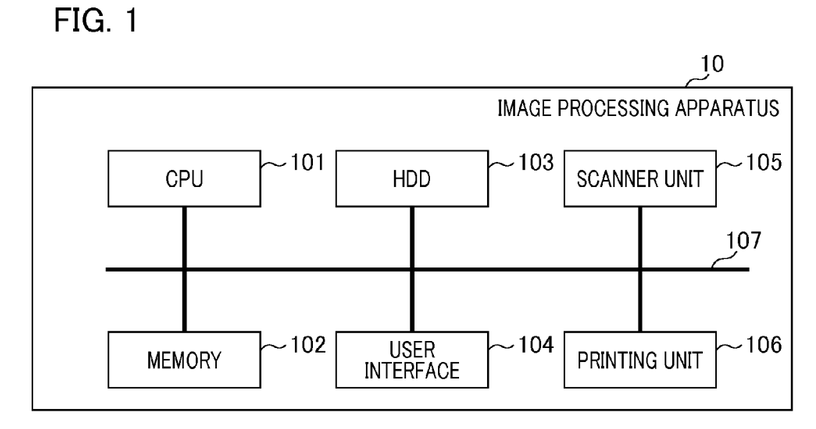
FIG. 1 is a diagram illustrating a configuration example of a display processing apparatus.

FIG. 1 is a diagram illustrating a configuration example of a display processing apparatus according to the first embodiment. The display processing apparatus according to this embodiment is an image processing apparatus 10 such as a printer or fax machine. It should be appreciated that the display processing apparatus may be an information processing apparatus other than an image processing apparatus.

The image processing apparatus 10 includes a CPU 101, a memory 102, an HDD 103, a user interface 104, a scanner unit 105, and a printing unit 106. "CPU" is the abbreviation for Central Processing Unit. "HDD" is the abbreviation for Hard Disk Drive. The units from the CPU 101 to the printing unit 106 are connected to each other via an internal bus 107. Each processing unit will be described below.

The CPU 101 is a processor for integrally controlling the image processing apparatus 10 overall. The CPU 101 executes an operating system (OS) and a program such as an application stored in the memory 102. The memory 102 has a random access memory (RAM) and a read only memory (ROM).

The memory 102 stores various instructions (OS and application program) executed by the CPU 101 to control the image processing apparatus 10, and the execution results. The HDD 103 is a storage unit used for storing large-capacity data such as image data scanned by the scanner unit 105 and for storing the execution code of the program. Compared to the memory 102, the HDD 103 stores data that must be stored for a longer period. The user interface 104 provides information to a user and receives instructions from a user. The user interface 104 has, for example, a touch panel display, on which a user can perform desired processing such as printing and storing via an operation display screen (not shown).

When the user interface 104 is a touch panel display, the CPU 101 detects a touch operation on the touch panel display. For example, the CPU 101 detects that a finger or a pointing device such as a pen has touched the touch panel display (hereafter referred to "touch down"). The CPU 101 also detects that a finger, pen, or the like is touching the touch panel display (hereafter referred to "touch on").

In addition, the CPU 101 detects that a finger, pen, or the like is moved on the touch panel display while touching with the display (hereafter referred to "move"). Further, the CPU 101 detects that a finger, pen, or the like has been released from the touch panel display (hereafter referred to "touch up"). Furthermore, the CPU 101 detects that nothing is touching the touch panel display (hereafter referred to "touch off").

A touch operation and the position of the touch operation (hereafter referred to "position coordinates") on the touch panel display are reported through the internal bus 107 to the CPU 101 as a touch detection signal. The CPU 101 determines which operation has been performed on the touch panel display based on the touch detection signal.

The touch detection signal represents any state of "touch down", "touch on", "move", "touch up", or "touch off" as described above. Taking "move" as an example, the CPU 101 determines that a finger, pen, or the like is moved on the touch panel display based on the touch detection signal. Accordingly, it is determined that the state is "move". In addition, the CPU 101 determines every vertical component and horizontal component on the touch panel regarding the moving direction of a finger or the like on the touch panel based on the change of the position coordinates.

Here, a series of touch operations from "touch down" through a certain amount of "move" to "touch up" on the touch panel display is referred to "drawing a stroke". In addition, a touch operation drawing a stroke very quickly is hereafter referred to as a "flick" or a "flick operation".

The flick operation is an operation during which a finger or the like is moved quickly for some distance while touching the touch panel, and then is released from the touch panel. In other words, this is a touch operation during which a finger or the like quickly traces the surface of the touch panel like flicking. Therefore, the CPU 101 determines that a flick operation has been performed when it has detected "move" over a predetermined distance or longer at a predetermined speed or faster followed by "touch up" based on the touch detection signal.

The CPU 101 also determines that a drag operation has been performed when "move" over the predetermined distance or longer at a speed less than the predetermined speed has been detected. The scanner unit 105 is an original copy reading apparatus that scans the original copy that is set on an original copy table (not shown) to obtain the image data. The printing unit 106 prints out print data on which image processing has been performed for printing, on storage media such as paper.

Figure 2:
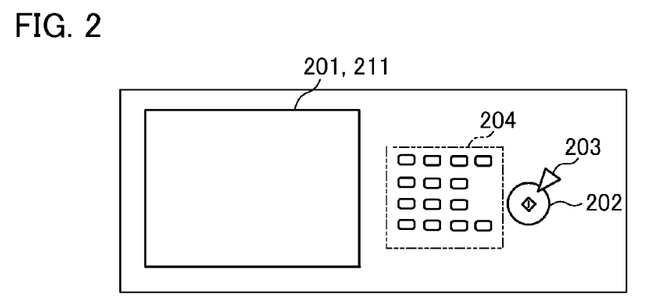
FIG. 2 is a diagram illustrating a configuration example of a user interface.

FIG. 2 is a diagram illustrating a configuration example of the user interface shown in FIG. 1. The image display unit 201 constitutes a touch panel display together with a touch detection unit 211. The image display unit 201 is, for example, a liquid crystal panel or organic electro luminescence (OEL) panel. The image display unit 201 displays an input screen including a setting area in which setting items are selectably arranged.

A start key 202 starts a reading operation of an original image. A stop key 203 stops an action that is in operation. A ten-key pad 204, which has a key group consisting of numbers and characters, provides instructions for the setting of the number of copies and screen switching of the image display unit 201. The touch detection unit 211 is located in the image display unit 201, thereby capable of detecting the following operations (1) to (5).

(1) A finger or pen has touched the touch panel display ("touch down").
(2) A finger or pen is touching the touch panel display ("touch on").
(3) A finger or pen is moved on the touch panel display while touching the display ("move").
(4) A finger or pen has been released from the touch panel display ("touch up").
(5) Nothing is touching the touch panel display ("touch off").

The touch detection unit 211 notifies the CPU 101 of any one of the above operations (1) to (5) that has been detected and/or information on the position coordinates at which a finger, pen, or the like is touching the touch panel display. The CPU 101 determines which operation has been performed on the touch panel display based on the reported information. When "move" is detected, the touch detection unit 211 also detects every vertical component and horizontal component on the touch panel display regarding the moving direction of a finger or pen moved on the touch panel display based on the change of the position coordinates.

Figure 3:
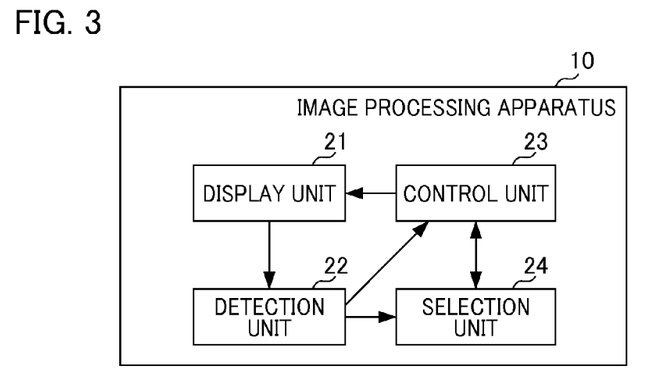
FIG. 3 is a diagram illustrating an example of a functional block diagram of an image processing apparatus.

FIG. 3 is a diagram illustrating an example of a functional block diagram of the image processing apparatus. FIG. 3 shows processing units required for display processing to select a setting, among the processing units included in the image processing apparatus 10. The image processing apparatus 10 includes a display unit 21, a detection unit 22, a control unit 23, and a selection unit 24. The functions of the units from the display unit 21 to the selection unit 24 are realized by causing the CPU 101 shown in FIG. 1 to load the computer program stored in the HDD 103 into the memory 102 and to execute the program. A control method according to this embodiment is also realized by the functions of each processing unit shown in FIG. 3.

The display unit 21 displays an input screen on the touch panel display. The input screen includes a setting area in which the setting items are selectably arranged. The detection unit 22 detects an operation on the input screen. The detection unit 22 corresponds to the CPU 101 and the touch detection unit 211.

The control unit 23 controls the change of setting items arranged in the setting area based on a detected operation. For example, the control unit 23 increases the number of the setting items arranged in the setting area when the detection unit 22 has detected a flick operation by a pointing device in the setting area, and moves the setting items in the setting area based on the speed of the flick operation. The selection unit 24 selects a specified setting item among the setting items in the setting area. Accordingly, the setting corresponding to the setting item is selected. For example, the selection unit 24 sets a setting item in the area of a predetermined selection position (selection area) in the setting area to a selected state, among a plurality of the setting items, whose number is increased by the control unit 23, arranged in the setting area.

Figure 4:
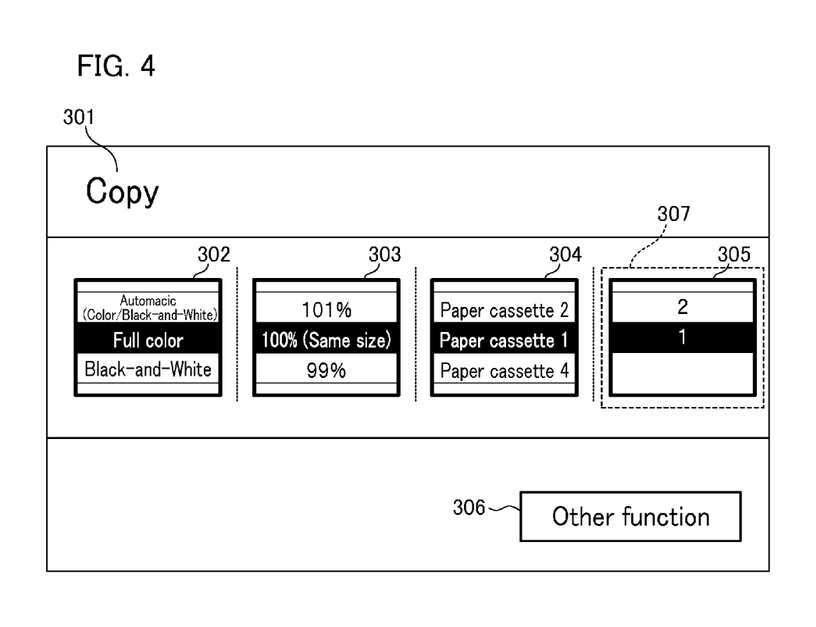
FIG. 4 is a diagram illustrating an example of an input screen displayed on an image display unit.

FIG. 4 is a diagram illustrating an example of an input screen displayed on the image display unit. The input screen shown in FIG. 4 includes a function display portion 301, a color-mode selection portion 302, a magnification selection portion 303, a paper selection portion 304, a number setting portion 305, another functional button 306, and a ten-key input display control 307.

The function display portion 301 displays a specified function of the image processing apparatus 10. In the example shown in FIG. 4, the function display portion 301 is displaying "COPY" function. The portions from the color mode selection portion 302 to the number setting portion 305 are setting areas for selecting detailed function settings relating to the function displayed by the function display portion 301. In each setting area, a plurality of setting items is selectably arranged.

In addition, the setting items in each setting area are arranged in an arrangement order according to a rule predetermined based on the functions indicated by the relevant setting items. For example, the setting items in the magnification selection portion 303 are arranged in an arrangement order according to a rule predetermined based on the numerical values (magnification) corresponding to the setting items. In the example shown in FIG. 4, the setting items in the magnification selection portion 303 are arranged such that the setting item "100% (same size)" is at the center, the setting item "101%" is above "100% (same size)", and the setting item "99%" is below "100% (same size)".

The color mode selection portion 302 is a setting area to select a setting for color mode. In the example shown in FIG. 4, "FULL COLOR" is selected among the setting items included in the color mode selection portion 302.

The magnification selection portion 303 is a setting area for selecting a magnification setting. In the example shown in FIG. 4, among the setting items included in the magnification selection portion 303, "100% (SAME SIZE)" is selected. The paper selection portion 304 is a setting area for selecting a setting for a paper cassette. In the example shown in FIG. 4, among the setting items included in the paper selection portion 304, "PAPER CASSETTE 1" is selected. The number setting portion 305 is a setting area for selecting a setting for the number of output copies. In the example shown in FIG. 4, among the setting items included in the number setting portion 305, the number of output copies "1" is selected. The other functional button 306 is used for selecting a setting other than the settings selectable in the setting areas displayed on the input screen. For example, when a user depresses the other functional button 306, the display unit 21 displays a screen for selecting a setting for two-sided printing, finishing, or the like.

The ten-key input display control 307 is a display frame indicating that input using the ten-key pad 204 shown in FIG. 2 is valid for the number setting portion 305. For example, when a user inputs "4" using the ten-key pad 204 in a display state shown in FIG. 4, the selection unit 24 sets 4 copies for the number of output copies.

Figure 5:
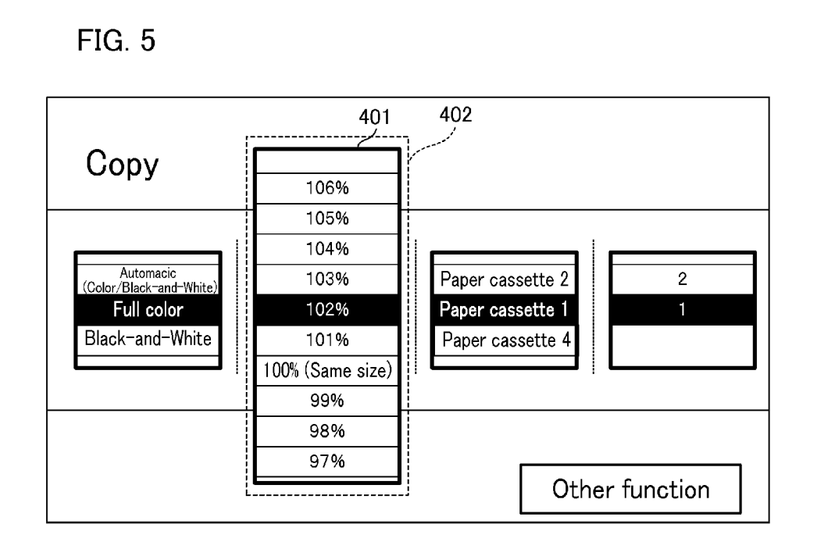
FIG. 5 is an example of an input screen when a flick operation has been detected.

When the detection unit 22 has detected a flick operation on any one of the setting areas of the color mode selection portion 302, the magnification selection portion 303, the paper selection portion 304, and the number setting portion 305, the control unit 23 enlarges the setting area where the flick operation has been detected, as shown in FIG. 5.

FIG. 5 is an example of an input screen when a flick operation has been detected. When a flick operation has been detected on the magnification selection portion 303, the control unit 23 changes (enlarges) the size of the magnification selection portion 303 into that of the magnification selection portion 401 shown in FIG. 5. In addition, the control unit 23 increases the number of the setting items included in the magnification selection portion 303, and incorporates the setting items, whose number has been increased as described above, into the magnification selection portion 401.

When the detection unit 22 has detected a touch down operation in the area of the magnification selection portion 401, the selection unit 24 selects the setting item on which touch down has been performed. Then, the control unit 23 returns the size of the magnification selection portion 401 to that of the magnification selection portion 303.

When the detection unit 22 has detected a flick operation in the area of the magnification selection portion 401, the control unit 23 moves the setting items in the area of the magnification selection portion 401 based on the speed of the flick operation. Consequently, selectable setting items are displayed one after another based on the speed of the flick operation.

The selection unit 24 may set a setting item in a predetermined selection position to a selected state, among the setting items displayed one after another in the area of the magnification selection portion 401. For example, the selection unit 24 sets the center position of the area of the magnification selection portion 401 to the selection position. Consequently, a user can select a setting item without performing "touch down" after a "flick", thereby decreasing the burden of the operation.

A ten-key input display control 402 is similar to the ten-key input display control 307 shown in FIG. 4. For example, in the display state shown in FIG. 4, when the detection unit 22 has detected a "touch down" operation in the area of the magnification selection portion 303, the control unit 23 moves the ten-key input display control 307 from the position at which the number setting portion 305 is surrounded to the position at which the magnification selection portion 303 (not shown) is surrounded.

When the detection unit 22 has detected a flick operation in the area of the magnification selection portion 303, the control unit 23 displays the ten-key input display control 402 such that the magnification selection portion 401 is surrounded, as shown in FIG. 5. The control unit 23 controls input using the ten-key pad 204 so as to be valid for the magnification selection portion 303 or the magnification selection portion 401. In this state, when a user inputs "200" using the ten-key pad 204, the selection unit 24 selects "200%" for the magnification.

If the detection unit 22 has detected a "touch down" or a "flick" in the area other than the magnification selection portion 401, the control unit 23 returns the size of the magnification selection portion 401 to that of the magnification selection portion 303. Note that, when a user depresses the start key 202 shown in FIG. 2, the control unit 23 also returns the size of the magnification selection portion 401 to that of the magnification selection portion 303.

Figure 6:
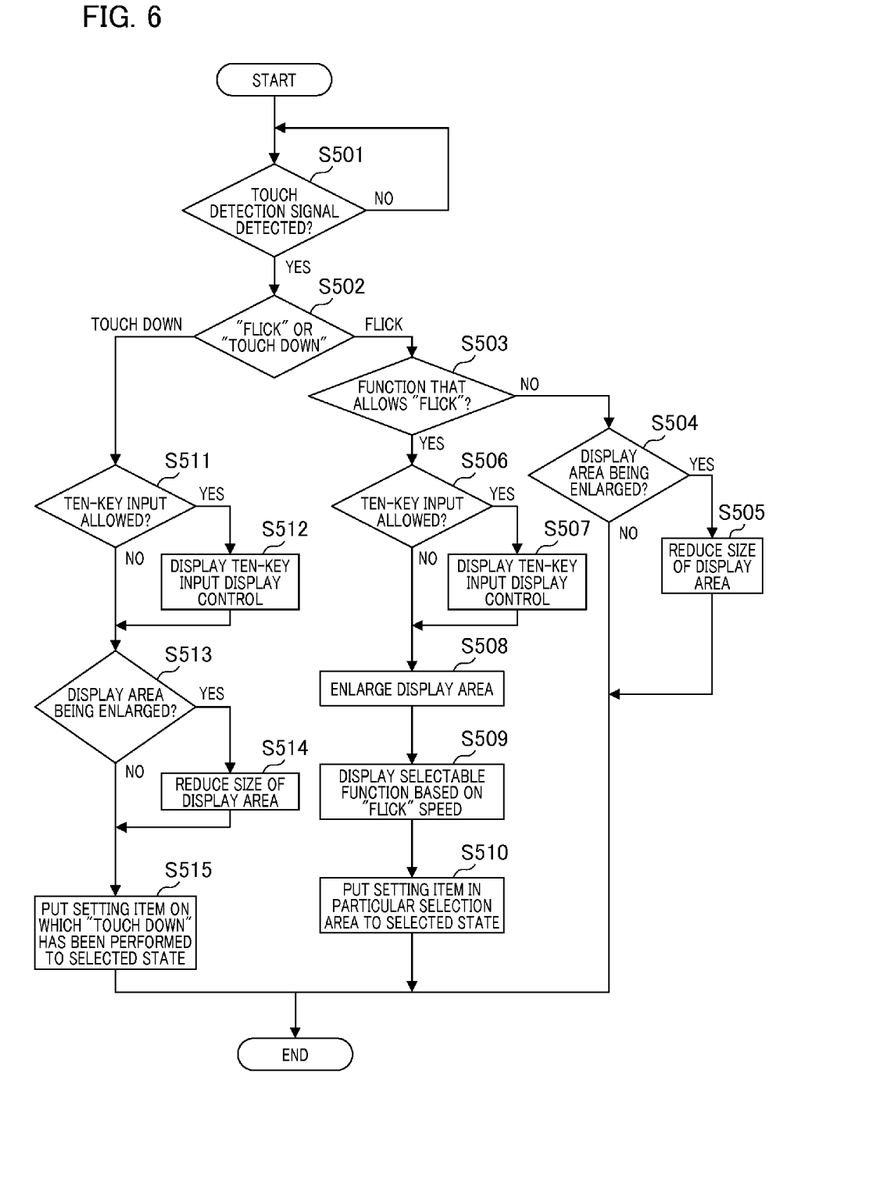
FIG. 6 is a flowchart illustrating an example of display processing according to a first embodiment.

FIG. 6 is a flowchart illustrating an example of display processing according to the first embodiment. In this example, a user performs setting using a "touch down" and/or a "flick". Note that the processing described with reference to FIG. 6 is realized by causing the CPU 101 to expand the program stored in HDD 103 into the memory 102 and to execute the program.

Firstly, in the input screen shown in FIG. 4, the detection unit 22 determines whether or not the touch detection unit 211 has detected a touch detection signal (step S501). When the touch detection signal has been detected, the control unit 23 determines whether the detected operation is a "flick" or "touch down" (step S502).

In step S502, when the detected operation is a "flick", the control unit 23 determines whether or not the function allows a "flick", that is, whether or not a "flick" has been performed on a setting area where a "flick" is allowed (step S503). In this example, the setting areas corresponding to the color mode selection portion 302, the magnification selection portion 303, the paper selection portion 304, and the number setting portion 305 respectively are assumed to be setting areas where a "flick" is allowed. Therefore, when a "flick" has been performed on any one of the areas of the units from the color mode selection portion 302 to the number setting portion 305, the control unit 23 determines that "flick" has been performed on a setting area where a "flick" is allowed.

When a "flick" has been performed on a display area other than the areas of the units from the color mode selection portion 302 to the number setting portion 305, the control unit 23 determines that a "flick" has not been performed on a setting area where a "flick" is allowed.

When the control unit 23 determines that the "flick" has not been performed on a setting area where a "flick" is allowed, the processing proceeds to step S504. Then, the control unit 23 determines whether or not the display area is enlarged (step S504). For example, when the display area is enlarged like the magnification selection portion 401 shown in FIG. 5, the control unit 23 reduces the size of the display area to that of the magnification selection portion 303 shown in FIG. 4 (step S505), and waits for the next input. When the control unit 23 determines that the display area is not enlarged, the control unit 23 determines that the input is invalid, and waits for the next input.

When the control unit 23 determines that the "flick" has been performed on a setting area where a "flick" is allowed, the processing proceeds to step S506. Subsequently, the control unit 23 determines whether or not the function corresponding to the setting area where a "flick" is allowed is a function that allows input using a ten-key pad, that is, a "flick" has been performed on a setting area where ten-key input (hardware key input) is allowed (step S506). In this example, it is assumed that the areas of the magnification selection portion 303 and the number setting portion 305 in FIG. 4 are setting areas where ten-key input is allowed.

When the control unit 23 determines that the "flick" has not been performed on a setting area where ten-key input is allowed, the processing proceeds to step S508. When the control unit 23 determines that a "flick" has been performed on a setting area where ten-key input is allowed, the processing proceeds to step S507. In this example, it is assumed that a "flick" has been performed in the area of the magnification selection portion 303 in FIG. 4.

Next, the control unit 23 displays the ten-key input display control 307 such that it surrounds the setting area on which a "flick" has been performed (step S507), and the processing proceeds to step S508. In other words, the control unit 23 controls to enable ten-key input to specify a setting corresponding to the setting area.

In step S508, the control unit 23 enlarges the setting area on which a "flick" has been performed (step S508). For example, the control unit 23 enlarges the size of the magnification selection portion 303 shown in FIG. 4 to that of the magnification selection portion 401 shown in FIG. 5.

Next, the control unit 23 displays selectable setting items in the setting area enlarged in step S508 based on the "flick" speed (step S509). Then, the control unit 23 sets a setting item in a particular selection area to a selected state (step S510). In this example, the control unit 23 sets the magnification setting item "102%" located at the center of the area of the magnification selection portion 401 to a selected state.

In step S502, when the detected operation is a "touch down", the control unit 23 determines whether or not the function corresponding to the setting area on which a "touched down" has been performed is a function that allows input using ten-key input, that is, the "touch down" has been performed on a setting area where ten-key input is allowed (step S511). When the control unit 23 determines that a "touch down" has not been performed on a setting area where ten-key input is allowed, the processing proceeds to step S513. When the control unit 23 determines that a "touch down" has been performed on a setting area where ten-key input is allowed, the processing proceeds to step S512.

Then, the control unit 23 displays the ten-key input display control 307 such that the setting area where a "touched down" has been performed is surrounded (step S512), and the processing proceeds to step S513.

Next, the control unit 23 determines whether or not the display area is enlarged (step S513). For example, when the display area is enlarged like the magnification selection portion 401 shown in FIG. 5, the control unit 23 reduces the size of the display area like the magnification selection portion 303 shown in FIG. 4 (step S514), and waits for the next input. When the control unit 23 determines that the display area is not enlarged, the control unit 23 sets the setting item on which "touch down" has been performed to a selected state (step S515), and waits for the next input.

Note that, in a variation of the first embodiment, which is not illustrated in the drawings, when a swipe operation, double tap operation, or long press operation by a pointing device has been detected on a setting area, the control unit 23 may execute the following processing. That is, the control unit 23 displays a setting area where a user can select a setting different from the settings selectable in the setting area when a flick operation has been detected as described above. For example, when a user performs a swipe operation by sliding a finger with the finger touching the setting item "100% (same size)" in the area of the magnification selection portion 303 in FIG. 4, the control unit 23 displays a setting item such as "automatic", "specify by length", "XY-independent zoom", or "somewhat small". The setting item "automatic" is a setting item to set a magnification automatically. "Specify by length" is a setting item to specify a magnification by length. "XY-independent zoom" is a setting item to set magnifications in X (horizontal direction) and Y (vertical direction) independently. "Somewhat small" is a setting item to set a magnification that is smaller by a predetermined amount than the setting item "100% (same size)" on which the finger has touched.

The display processing apparatus according to the first embodiment as described above enables a user to easily select a desired setting from a plurality of settings.

(Second Embodiment)

Next, a display processing apparatus according to the second embodiment will be described. If a display processing apparatus that allows a desired setting by a "flick" displays all setting items in units of 1% in the magnification selection portion 401 in FIG. 5 for example, a user may have a problem of missing a setting item corresponding to a frequently-used special setting. The special setting is a standard setting such as a standard magnification for example. Hereafter, a setting item corresponding to the standard setting is referred to as a "standard setting item". In contrast, a setting item corresponding to an arbitrary setting is referred to as an "arbitrary setting item". The display processing apparatus according to the second embodiment controls the display of the standard setting item and arbitrary setting item so as to be distinguished from each other when "flick" has been performed on a setting area. The basic configuration of the display processing apparatus according to the second embodiment is similar to that of the display processing apparatus according to the first embodiment. The display processing apparatus according to the second embodiment is configured as the image processing apparatus 10 shown in FIG. 1.

Figure 7:
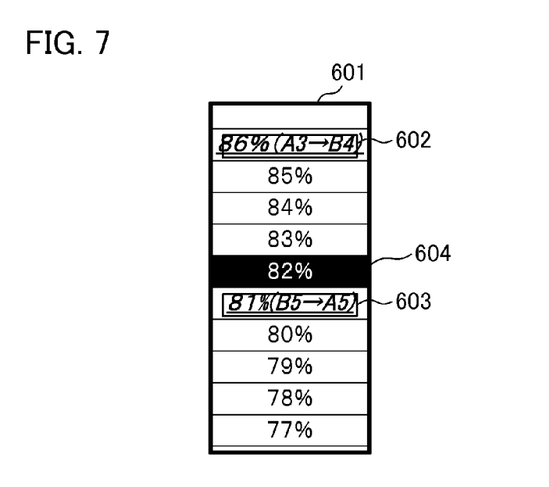
FIG. 7 is a diagram illustrating a display example of a setting area in a second embodiment.

FIG. 7 is a diagram illustrating a display example of a setting area in the second embodiment. A setting area 601 is the setting area (the magnification selection portion in this example) that is enlarged when a "flick" has been detected. In the setting area 601, "86% (A3->B4)" and "81% (B5->A5)" are setting items for the standard magnification. The setting items for the standard magnification are examples of standard setting items. The setting items for the standard magnification are provided with enlargement rates or reduction rates based on a predetermined paper size. In contrast, "83%" and the like in the setting area 601 are the setting items for the arbitrary magnification. The setting items for the arbitrary magnification are setting items to specify any magnification. Therefore, the control unit 23 of the image processing apparatus 10 highlights an area displaying the standard setting item. In this example, the control unit 23 highlights the standard setting items by surrounding them with rectangles 602 and 604. It should be appreciated that the control unit 23 may highlight them with a different color, different font type, different font size, bolder font, or the like.

The reference numeral 604 indicates a selection area. In FIG. 7, since the magnification setting "82%" is in the selection area, the selection unit 24 sets "82%" to a selected state. Note that when a setting item on the selection area 604 becomes a standard setting item by a "flick", the control unit 23 may control the display such that the setting items in the setting area move slowly.

In addition, the control unit 23 may control the display such that the movement of setting items in the setting area stops at the time when a setting item in the selection area 604 becomes a standard setting item. In this way, the control unit 23 controls the moving speed of the setting items displayed in the setting area when a standard setting item is in the selection area, thereby highlighting the standard setting item. Hereafter, such highlight is referred to "highlight based on display speed". Specifically, the control unit 23 changes the moving speed of setting items in the setting area when a standard setting item is in the selection area so as to be distinguished from the moving speed of setting items when a standard setting item is not in the selection area.

Figure 8:
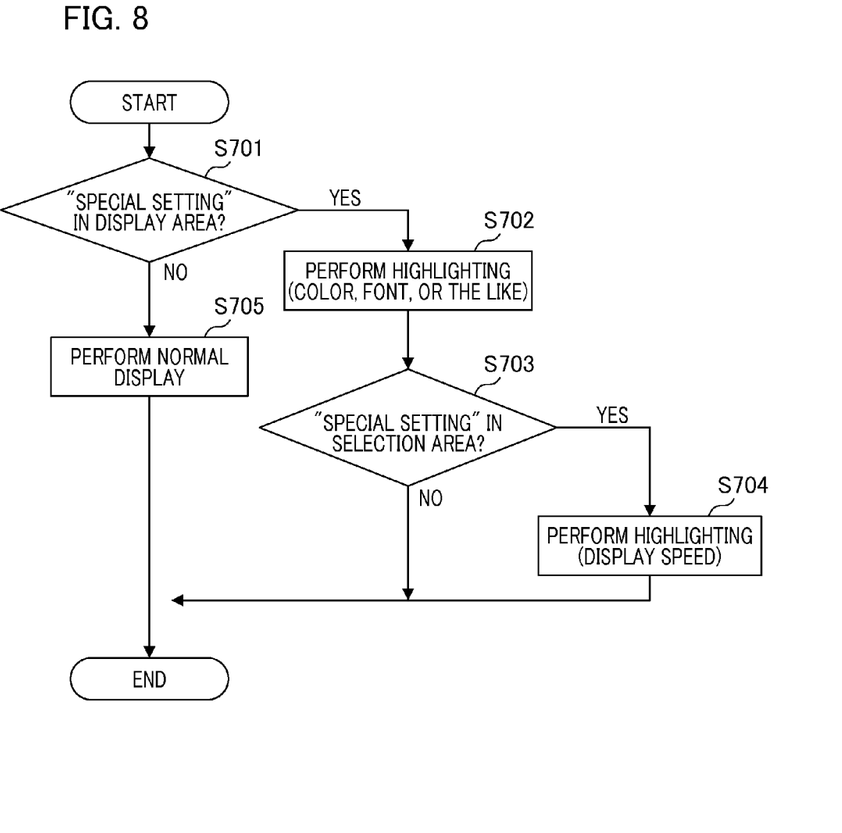
FIG. 8 is a flowchart illustrating a part of display processing according to the second embodiment.

FIG. 8 is a flowchart illustrating a part of display processing according to the second embodiment. The fundamental display processing according to the second embodiment is similar to the display processing shown in FIG. 6. In the second embodiment, the image processing apparatus 10 executes the following highlight processing. This highlight processing corresponds to step S506 in FIG. 6. This highlight processing is also realized by causing the CPU 101 to expand the program stored in HDD 103 into the memory 102 and to execute the program.

Firstly, the control unit 23 determines whether or not a standard setting item is in the display area (step S701). When the control unit 23 determines that a standard setting item is not in the display area, the control unit 23 performs a normal display (step S705).

When the control unit 23 determines that a standard setting item is in the display area, the control unit 23 highlights the standard setting (step S702). For example, the control unit 23 changes the color or font of the standard setting item so as to be distinguished from the color or font of an arbitrary setting item.

Next, the control unit 23 determines whether or not the standard setting item is in the selection area (step S703). When the control unit 23 determines that the standard setting item is not in the selection area, the processing is terminated. When the control unit 23 determines that the standard setting item is in the selection area, the processing proceeds to step S704. Then, the control unit 23 performs highlighting based on display speed (step S704).

The display processing apparatus according to the second embodiment enables a user to easily select a desired setting since the standard setting item is highlighted so as to be distinguished from the arbitrary setting item.

(Third Embodiment)

Next, the third embodiment will be described below. For example, in the magnification selection portion 303 in FIG. 4, it is assumed that "flick" has been performed in a state in which "100% (SAME SIZE)" is displayed. If the image processing apparatus 10 displays setting items in units of 1% like the magnification selection portion 401 shown in FIG. 5, a user has to continue to "flick" until the maximum magnification is displayed in the case when the user desires to maximize the magnification. Hence, when a "flick" is performed quickly, a display processing apparatus according to the third embodiment increases the unit of magnification settings corresponding to magnification setting items displayed in the setting area, for example. The unit of the magnification settings is the interval of magnifications corresponding to the interval between each magnification setting item adjacent to each other.

The basic configuration of the display processing apparatus according to the third embodiment is similar to that of the display processing apparatus according to the first embodiment. The display processing apparatus according to the third embodiment is configured as the image processing apparatus 10 shown in FIG. 1.

Figure 9:
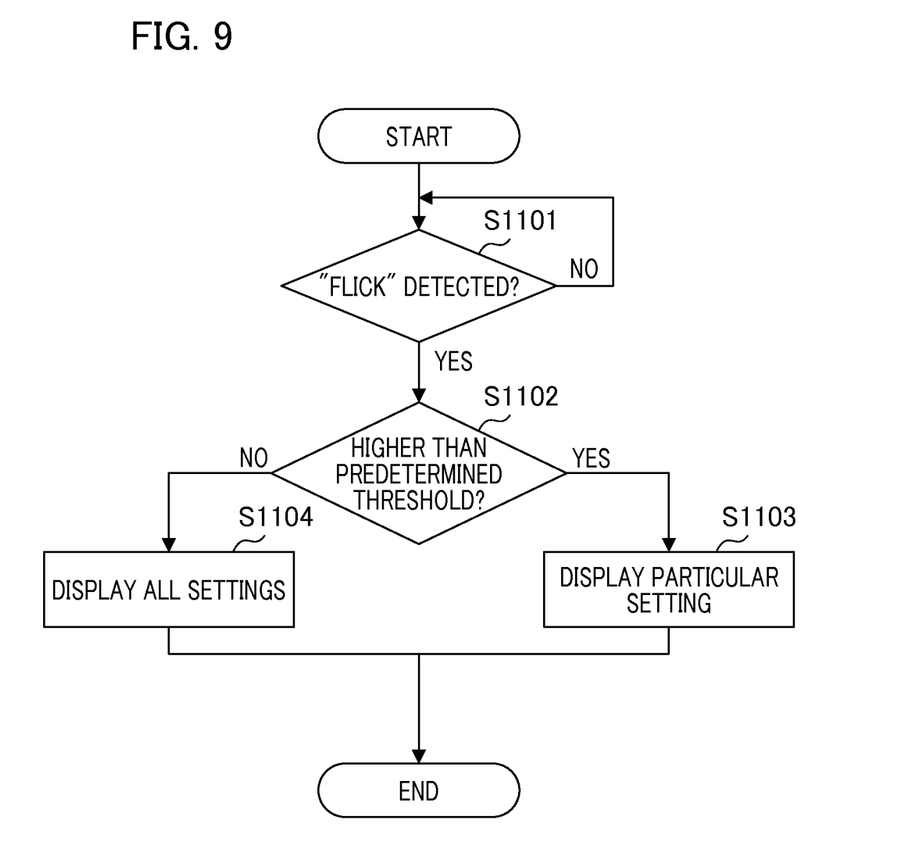
FIG. 9 is a flowchart illustrating a part of display processing according to a third embodiment.

FIG. 9 is a flowchart illustrating a part of display processing according to the third embodiment. The fundamental display processing according to the third embodiment is similar to the display processing shown in FIG. 6. In the third embodiment, the image processing apparatus 10 executes display processing as described below. This display processing corresponds to step S506 in FIG. 6. This display processing is also realized by causing the CPU 101 to expand the program stored in HDD 103 into the memory 102 and to execute the program.

Figure 10A:
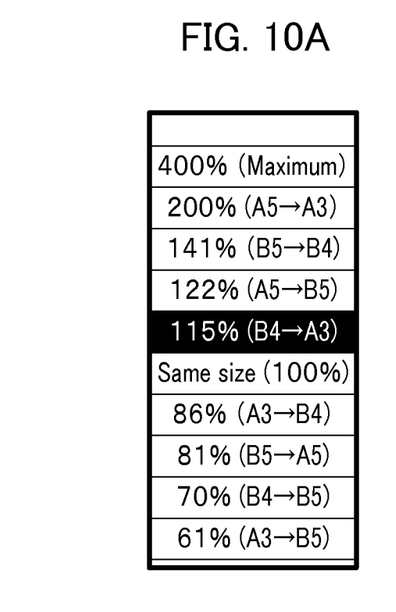
FIGS. 10A to 10C are diagrams illustrating display examples of a setting area in the third embodiment.
Figures 10B, 10C:
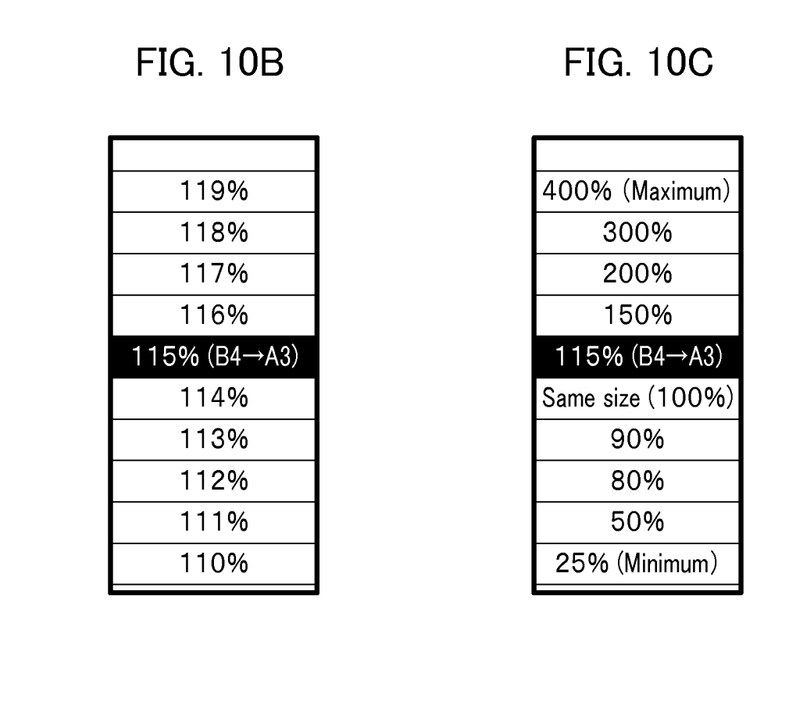

Firstly, the control unit 23 determines whether or not a "flick" has been performed on the display area (step S1101). When a "flick" has been performed, the control unit 23 determines whether or not the speed of the "flick" is higher than a predetermined threshold (step S1102). The speed of the "flick" is the moving speed of setting items in the setting area. When the speed of the "flick" is not higher than the threshold, the control unit 23 displays all setting items (step S1104). In step S1104, the control unit 23 displays magnification setting items in units of 1% for example as shown in FIG. 10B.

When the speed of the "flick" is higher than the threshold, the control unit 23 displays only setting items corresponding to particular functions (step S1103). In step S1103, the control unit 23 displays only the setting items of the standard magnification for example as shown in FIG. 10A. The control unit 23 may display the magnification setting items in different units of magnification as shown FIG. 10C. Specifically, the control unit 23 displays only setting items corresponding to particular numerical values in the setting area so as to increase the interval of the numerical values corresponding to each setting item arranged adjacent to each other in the setting area.

Note that, when a user performs a "flick" very quickly again after the processing of the above described step S1104, the control unit 23 may display only standard magnifications as shown in FIG. 10A.

When the speed of a "flick" is over the threshold, the display processing apparatus according to the third embodiment switches displayed setting items, from all setting items to setting items corresponding to particular functions. Consequently, a user can quickly find a desired setting item and easily select a setting.

(Other Embodiments)

The present invention can also be realized by executing the following processing. Specifically, a software (program) that realizes the functions of the above described embodiments is provided through a network or various storage media to a system or apparatus, and the computer (or CPU, MPU, or the like) of the system or apparatus reads out and executes the program. In this case, the program and storage media storing the program are to constitute the present invention.

While the embodiments of the present invention have been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-228427 filed on Oct. 15, 2012 which is hereby incorporated by reference herein in its entirety.

What is claimed is:

1. A display processing apparatus comprising:
   a display unit configured to display an input screen including a setting area in which two or more of a first number of setting items are selectably arranged;
   a detection unit configured to detect an operation on the input screen;
   a display control unit configured to (1) enlarge the setting area in accordance with a flick operation on the setting area detected by the detection unit, (2) change the first number of setting items to be displayed on the enlarged setting area to a second number of setting items, which is greater than the first number of setting items, to be displayed on the enlarged setting area, and (3) scrollably display the second number of setting items on the enlarged setting area; and
   a selection unit configured to set a setting item in a predetermined selection area in the enlarged setting area to a selected state.

2. The display processing apparatus according to claim 1, wherein the selectable setting items include (a) a standard setting item corresponding to a standard setting and (b) an arbitrary setting item corresponding to an arbitrary setting, and
   wherein the display control unit controls the display of the standard setting item so as to be distinguished from the display of the arbitrary setting item on the enlarged setting area.

3. The display processing apparatus according to claim 2, wherein the display control unit changes the color or font of the standard setting item so as to be distinguished from the color or font of the arbitrary setting item on the enlarged setting area.

4. The display processing apparatus according to claim 2, wherein the display control unit determines whether or not the standard setting item is in the selection area on the enlarged setting area, and, when the display control unit determines that the standard setting item is in the selection area, the display control unit highlights the standard setting item in the selection area.

5. The display processing apparatus according to claim 4, wherein the display control unit changes the scrolling speed of setting items in the setting area when the standard setting item is in the selection area so as to be distinguished from the scrolling speed of setting items when the standard setting item is not in the selection area.

6. The display processing apparatus according to claim 3, wherein the setting items in the setting area are arranged in an arrangement order according to a rule predetermined based on the functions indicated by the setting items, and
   wherein the display control unit (a) determines whether or not the moving speed of the setting items in the setting area is over the predetermined threshold, and, (b) when the moving speed of the setting items is over the threshold, displays only setting items corresponding to particular functions in the setting area.

7. The display processing apparatus according to claim 6, wherein setting items in the setting area are arranged in an arrangement order according to a rule predetermined based on numerical values corresponding to the setting items, and
   wherein, when the scrolling speed of the setting items is over the threshold, the display control unit displays only setting items corresponding to particular numerical values in the setting area so as to increase the interval of the numerical values corresponding to each setting item arranged adjacent to each other in the setting area.

8. The display processing apparatus according to claim 2, wherein the input screen includes at least a setting area in which magnification setting items corresponding to magnification settings are selectably arranged, and
   wherein the magnification setting items include setting items of standard magnification provided with enlargement rates and reduction rates based on a predetermined paper size, and setting items of arbitrary magnification to specify any magnification.

9. The display processing apparatus according to claim 1, wherein the input screen includes a plurality of the setting areas, and
   wherein, when the detection unit has detected a flick operation in the setting area, the display control unit determines whether or not the setting area is a setting area where hardware key input is allowed, and when the setting area is a setting area where hardware key input is allowed, the display control unit controls to enable the hardware key input to specify a setting corresponding to the setting area.

10. The display processing apparatus according to claim 1, wherein, when the detection unit has detected a touch down operation in the setting area, the selection unit sets the setting item on which the touch down has been performed to a selected state.

11. The display processing apparatus according to claim 1, wherein, when the detection unit has detected a swipe operation, double tap operation, or long press operation in the setting area, the display control unit displays a setting area where a user can select a setting different from the settings corresponding to the setting items selectable in the setting area when the flick operation has been detected.

12. A control method of display processing apparatus, the method comprising the steps of:
   displaying an input screen including a setting area in which two or more of a first number of setting items are selectably arranged;
   detecting an operation on the input screen;
   enlarging the setting area in accordance with a flick operation on the setting area detected by the detecting step,
   changing the first number of setting items to be displayed on the enlarged setting area to a second number of setting items, which is greater than the first number of setting items, to be displayed on the enlarged setting area;
   scrollably displaying the second number of setting items on the enlarged setting area; and
   setting a setting item in a predetermined selection area in the enlarged setting area to a selected state.

13. A non-transitory computer-readable storage medium storing a program for causing a computer to execute a control method comprising:

displaying an input screen including a setting area in which two or more of a first number of setting items are selectably arranged;
detecting an operation on the input screen;
enlarging the setting area in accordance with a flick operation on the setting area detected by the detecting step,
changing the first number of setting items to be displayed on the enlarged setting area to a second number of setting items, which is greater than the first number of setting items, to be displayed on the enlarged setting area;
scrollably displaying the second number of setting items on the enlarged setting area; and
setting a setting item in a predetermined selection area in the enlarged setting area to a selected state.

* * * * *